Nov. 13, 1945.   D. R. DOUSLIN ET AL   2,388,834
FURFURAL PURIFICATION
Filed July 6, 1943
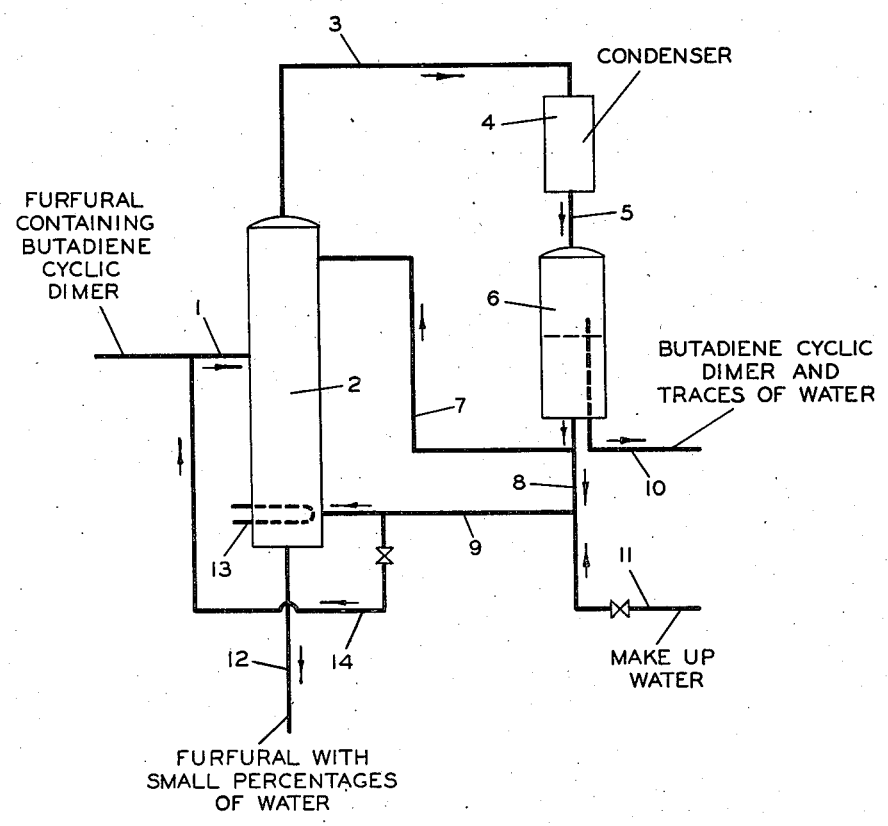
INVENTORS
D. R. DOUSLIN
BY C. F. WEINAUG
ATTORNEYS Patented Nov. 13, 1945

2,388,834

UNITED STATES PATENT OFFICE 2,388,834

FURFURAL PURIFICATION

Donald R. Douslin, Bartlesville, Okla., and Charles F. Weinaug, Phillips, Tex., assignors to Phillips Petroleum Company, a corporation of Delaware Application July 6, 1943, Serial No. 493,678

11 Claims. (Cl. 202—46)

This invention relates to a method for removing butadiene cyclic polymers from a butadiene solvent extraction agent. More specifically, it relates to the removal of 4-vinylcyclohexene-1 (1,3-butadiene cyclic dimer) from furfural by fractional distillation in the presence of water.

Furfural has become one of the most important solvent extraction agents for the recovery of butadiene from a stream containing the same such as a cracked gas stream. One of the preferred methods for recovering butadiene wherein furfural is used as a selective solvent has been disclosed in K. H. Hachmuth's copending application Serial No. 454,312, filed August 10, 1942. The steps consist essentially of depropanizing a cracked gas stream from which substantially all of the aromatics and tars have been removed. The depropanizing step is operated in such a way as to remove substantially all of the C₃ and lighter hydrocarbons as an overhead product. It is particularly important that as much of the methyl acetylene as possible be removed in this step. Otherwise, it will subsequently appear as a contaminant in the butadiene which is highly undesirable when the butadiene is to be used in the manufacture of synthetic rubber polymers. The bottom product from the depropanizing step is then fractionated to obtain a C₄ concentrate. This fractionation step is so conducted that all of the C₄ hydrocarbons, except for about one-half of the butenes-2 (both high and low boiling) and part of the vinylacetylene, are removed as the overhead product. It is this overhead product from the debutanizing step which is subjected to selective solvent extraction with furfural to selectively absorb substantially all of the butadiene, about one-half of the butenes-2, and practically all of the vinylacetylene. The overhead product from the furfural absorption step will generally consist of practically all of the normal butane, isobutane, isobutylene, butene-1, about one-half of the butenes-2, and traces of vinylacetylene, butadiene, and furfural. The furfural rich in butadiene is then subjected to a stripping step to remove overhead the butadiene, butenes-2 and other selectively absorbed hydrocarbons. The butadiene-rich overhead product from the stripping step is then fractionated to obtain butadiene of high purity, 98 per cent or better, as the overhead product. The butenes-2, vinylacetylene, polymer, etc., constitute the bottom product.

During the course of the furfural absorption step a certain amount of polymerization of butadiene to the cyclic dimer, 4-vinylcyclohexene-1, occurs. This dimer remains in the furfural and, in conventional operation, is recycled with the furfural to the absorption and stripping zones. The presence of this dimer is objectionable because it reduces the selectivity of the solvent and may further polymerize or copolymerize to give heavier objectionable materials. For these reasons it is desirable to provide some means for the removal of 4-vinylcyclohexene-1 from furfural used in butadiene recovery. Such a method is provided by our invention. Our invention takes advantage of the discovery that the equilibrium vaporization constant of 4-vinylcyclohexene-1 and water in the ternary system furfural-water-4-vinylcyclohexene-1 is greater than that for furfural. Consequently, when, in accordance with the present invention, such a ternary mixture is subjected to distillation practically all of the 4-vinylcyclohexene-1 and most of the water can be removed as an overhead product from the furfural which largely remains in the bottoms or kettle product. More specifically, our invention involves carrying out this separation by fractional distillation in a multi-tray fractionator of conventional type and takes advantage of the fact that the solubility of furfural in water is considerably greater than that of 4-vinylcyclohexene-1 in water by refluxing the fractionating tower with water and thus scrubbing substantially all of the furfural from the overhead vapors leaving the fractionator, thereby retaining the furfural in the fractionating column to be eventually removed as bottom product and obtaining an overhead product consisting almost entirely of water and 4-vinylcyclohexene-1. Further advantage is taken of the low solubility of 4-vinylcyclohexene-1 in water by condensing the overhead 4-vinylcyclohexene-1-water mixture to obtain two phase separation of water and 4-vinylcyclohexene-1 and using the resultant water phase as reflux to the fractionating column. The 4-vinylcyclohexene-1 phase is discarded. Also, temperatures below those which tend to promote rapid furfural polymerization are maintained in the reboiler section of the fractionator by injecting water into the reboiler section and taking advantage of the fact that the boiling point of furfural containing small percentages of water is appreciably lower than that of pure furfural. The water preferably is obtained from the water phase of the reflux accumulator.

Broadly stated, the present invention involves maintaining the concentration of an undesired hydrocarbon in furfural used in the solvent extraction of hydrocarbons, and especially of butadiene cyclic dimer in furfural used in the solvent extraction of butadiene, at a desirably low level by feeding the furfural containing the hydrocarbon, specifically butadiene cyclic dimer to a distillation zone and there distilling it in the presence of water, i. e. steam-distilling it, and removing from the distilling zone an overhead product containing water and the hydrocarbon and a bottom product of furfural of reduced content of the hydrocarbon.

The distillation step may be a simple partial evaporation. Since partial evaporation of the feed in the presence of water (either added or already present in the feed) does not result in a substantially complete separation between the furfural and the hydrocarbon some furfural goes over in the overhead. Likewise some hydrocarbon may appear in the furfural withdrawal.

It is preferred however to carry out the distillation in a multitray fractionator, i. e. ordinary fractional distillation whereby a substantially complete separation between the furfural and the hydrocarbon is effected so that the overhead product will consist essentially of water and hydrocarbon and will contain very little furfural.

The overhead product (the water-hydrocarbon mixture) is condensed causing separation into two phases, namely a water phate with a small amount of furfural dissolved therein and a predominantly hydrocarbon phase. The water phase is recycled to the partial evaporation or the fractional distillation zone while the hydrocarbon phase is discarded. Even where partial evaporation is employed, the amount of furfural present in the discarded hydrocarbon-furfural phase is small so that the loss of furfural is negligible.

By referring to the accompanying drawing our invention will be more readily understood. The drawing is a schematic diagram of one embodiment of our invention where furfural containing cyclic butadiene dimer is fed to a fractionating column 2 through line 1. The furfural feed may be either dry or contain small percentages of water (4 to 8 weight per cent, for example). In fractionator 2 the furfural feed is contacted with water at both the bottom and top of the tower. The water is obtained from reflux accumulator 6 which will be described later. The water-furfural-4-vinylcyclohexene-1 mixture is heated by reboiling means 13 to supply stripping vapors. Water and 4-vinylcyclohexene-1 vapors leave fractionator 2 through line 3. These vapors are then cooled in reflux condenser 4. The resultant liquid is collected in accumulator 6 where two phase separation occurs. The lower layer is the water-rich phase and the upper layer is the 4-vinylcyclohexene-1-rich phase. Most of the water-rich phase is refluxed to the top of column 2 by means of line 7. The remaining portion of the water phase is fed to the bottom of column 2 by means of line 8 branching from 7 and line 9. Line 11 connecting to lines 8 and 9 provides a means for the addition of water to the system to replace that which may be lost through leaks or dissolved in products removed from the system. The 4-vinylcyclohexene-1 rich phase is removed from reflux accumulator 6 by means of line 10. Furfural containing small amounts of water is removed from the bottom of fractionator 2 by means of line 12.

The purpose of refluxing water to the top of the fractionating tower is to scrub out any furfural carried over in the water-4-vinylcyclohexene-1 overhead product. This is possible since furfural is about 40 to 100 times more soluble in water than is 4-vinylcyclohexene-1. The advantage of refluxing the fractionator with the water phase from the reflux accumulator rather than with a fresh water stream is that if any furfural should be carried over in the overhead product, a proportion of it will be dissolved in the water phase leaving the reflux accumulator and consequently the furfural that would otherwise be lost is retained in the system. This reflux also aids in controlling the top temperature of the fractionating tower.

Water is also introduced at the bottom of the fractionating tower in order to be sure that sufficient water is present in the reboiler section of the tower to permit reboiling at a temperature below that at which furfural polymers are likely to form and yet to supply the water vapors needed for stripping the 4-vinylcyclohexene-1 from the mixture. An auxiliary line 14 is indicated in the drawing for supplying the water with the feed rather than at the bottom of the tower. Either method or both may be used. However, it will usually be preferable to introduce the water at the bottom of the tower. The water supplied to the bottom of the tower or with the feed preferably is obtained from the reflux accumulator insofar as possible. In cases where the bottom product removed from the system contains a larger percentage of water than the feed, additional water will have to be supplied from an external source. Usually, however, furfural used in the solvent recovery of butadiene will contain a small percentage of water, since a small percentage of water is advantageous for this operation as is disclosed in K. H. Hachmuth's copending applications Serial No. 438,844, filed April 13, 1942, and Serial No. 482,435, filed April 9, 1943. Consequently, the furfural feed to the fractionator for the removal of cyclic butadiene dimer will generally contain the amount of water found most advantageous in carrying out the butadiene recovery operation. This will be about 4 to 8 per cent by weight. Therefore, it generally will not be necessary to remove a bottom product containing more water than the feed when the bottom product is being returned to a butadiene extraction unit. If it is desired that substantially dry furfural be returned to the butadiene solvent recovery operation, in accordance with the method disclosed in K. H. Hachmuth's above-mentioned copending application Serial No. 482,435, filed April 9, 1943, the bottom product from the fractionating tower for the removal of 4-vinylcyclohexene-1 will have to be submitted to a water removal step, which is also described in said application.

The extent to which water in furfural effects a lowering of the boiling point varies with the amount of water used. The presence of up to 3 or 4 per cent by weight of water causes a very marked decrease in the boiling point of furfural. For additional small percentages the boiling point is depressed considerably less. This is shown by the following tabulation:

| | B. P. °F. |
|---|---|
| Furfural | 323 |
| Furfural+1% water by weight | 296 |
| Furfural+2% water by weight | 229 |
| Furfural+3% water by weight | 220 |
| Furfural+4% water by weight | 215 |
| Furfural+6% water by weight | 211 |
| Furfural+8% water by weight | 209.5 |

The boiling point approaches a minimum of 208° F. It can be seen that ordinarily little advantage is to be gained by using an amount of water greater than 4 to 8 per cent. While the foregoing considerations involve simple furfural-water mixtures, the presence in the mixture of butadiene cyclic dimer, 4-vinylcyclohexene-1, in the ordinarily encountered concentrations of not over a few per cent, does not vitiate the conclusions to be drawn. In the practice of the present invention, it is ordinarily preferred to continuously maintain a concentration of water in the fractionator such that the temperature at no point therein exceeds about 215° F. when operating under atmospheric pressure conditions.

The amount of water required in the fractionating tower for the removal of 4-vinylcyclohexene-1 will be dependent upon the amount required to maintain the desired temperature in the bottom of the tower and the amount required as reflux to scrub out any furfural that tends to leave overhead with the 4-vinylcyclohexene-1. Usually it is desirable to have available in the reflux accumulator a volume of water about 3 to 4 times greater than the volume of 4-vinylcyclohexene-1 normally anticipated in the fractionating tower at a time and to maintain in the tower at every point thereof at least 3 and preferably 4 parts by volume of water per part of butadiene cyclic dimer therein.

The pressures at which such a column may be run can be varied over a considerable range from sub-atmospheric to super-atmospheric. Usually, however, it will be preferable to operate in the range of substantially atmospheric to a slight positive pressure. When operating below atmospheric pressure, there is danger of air (oxygen) leaking into the system. Air (oxygen) tends to promote furfural polymer formation. Operating at high pressures is usually undesirable from the standpoint of the higher temperatures required. Overly high temperatures also promote furfural polymer formation. By operating at substantially atmospheric or a slight positive pressure, say from 0 to 50 pounds per square inch gage, these difficulties are greatly minimized.

A number of advantages result from our invention. For example, we have ascertained that furfural and 4-vinylcyclohexene-1 form a minimum boiling type azeotrope. However, we have found that this azeotrope is apparently effectively broken when a sufficient amount of water is used. Consequently, the butadiene cyclic dimer can readily be fractionated from the furfural with substantially no loss of furfural. Furthermore, by reason of its limited solubility in water the cyclic butadiene dimer recovered as an overhead product in the fractional distillation of furfural and cyclic butadiene dimer by our invention is a product of relatively high purity, thus a means is also provided for recovering a desirable product for use in synthesizing other hydrocarbons. Our invention in providing a means for removing 4-vinylcyclohexene-1 from furfural improves the effectiveness of the furfural as a selective solvent for the recovery of butadiene-1,3. Also our invention gives a furfural product containing a percentage of water in the range of that desirable for butadiene recovery.

While the invention is particularly applicable to the removal of butadiene cyclic dimer, it is not limited thereto but may be employed to effect the removal of any hydrocarbon which accumulates in the furfural, provided the normal boiling point of the hydrocarbon contaminant is not too high, i. e. not above the boiling point of furfural.

We claim:

1. A process of maintaining the concentration of butadiene cyclic dimer in furfural used in solvent extraction of butadiene at a desirably low level which comprises feeding furfural containing butadiene cyclic dimer to a distillation zone and distilling it therein in the presence of water, taking overhead a product containing water and said butadiene cyclic dimer, and withdrawing a bottom product of furfural of lowered butadiene cyclic dimer content.

2. A process of maintaining the concentration of butadiene cyclic dimer in furfural used in solvent extraction of butadiene at a desirably low level which comprises feeding furfural containing butadiene cyclic dimer to a partial evaporation zone and partially evaporating it in the presence of water, taking overhead a product containing water, said butadiene cyclic dimer and some furfural, condensing said overhead product to obtain two phase separation into a water-furfural phase and a butadiene cyclic dimer-furfural phase, recycling the water-furfural phase to said zone, discarding said butadiene cyclic dimer-furfural phase, and withdrawing a bottom product of furfural of lowered butadiene cyclic dimer content.

3. The process of removing butadiene cyclic dimer from furfural which has been employed in the solvent extraction of butadiene and thereby contaminated with butadiene cyclic dimer which comprises feeding said dimer-contaminated furfural to a fractional distillation zone and therein fractionally distilling the same in the presence of water, taking overhead a product consisting essentially of water and said cyclic dimer, and withdrawing a bottom product of furfural essentially free from butadiene cyclic dimer.

4. The process of removing butadiene cyclic dimer from furfural which has been employed in the solvent extraction of butadiene and thereby contaminated with butadiene cyclic dimer which comprises feeding said dimer-contaminated furfural to a fractional distillation zone and therein fractionally distilling the same in the presence of water, taking overhead a product consisting essentially of water and said cyclic dimer, refluxing the distillation column with water and thereby scrubbing substantially all of the furfural from the overhead vapors leaving the same and thereby retaining the furfural in the column to be eventually removed as bottom product, and withdrawing a bottom product of furfural essentially free from butadiene cyclic dimer.

5. The process of claim 4 including the further steps of condensing said overhead water-butadiene cyclic dimer mixture to obtain two phase separation into a water-phase and a butadiene cyclic dimer-phase, and using the resultant water phase in said refluxing of said column.

6. The process of claim 4 including the further steps of condensing said overhead water-butadiene cyclic dimer mixture to obtain two phase separation into a water-phase and a butadiene cyclic dimer-phase, introducing the resultant water phase adjacent the top of said column as reflux therefor, and introducing water adjacent the bottom of said column to maintain the temperature therein below the point of rapid furfural polymerization.

7. The process of claim 3 including the further steps of introducing water adjacent the top of said zone as reflux therefor, and introducing water adjacent the bottom of said column in amount such as to maintain the temperature therein at not above about 215° F. when operating under atmospheric pressure conditions.

8. The process of claim 3 wherein at least 3 parts by volume of water per part of butadiene cyclic dimer is maintained throughout said distillation zone.

9. The process of claim 3 including the further steps of introducing water adjacent the top of said zone as reflux therefor, and introducing extraneous water with the furfural feed to said zone.

10. A process of maintaining the concentration of butadiene cyclic dimer in furfural used in solvent extraction of butadiene at a desirably low level which comprises feeding furfural containing butadiene cyclic dimer to a partial evaporation zone and partially evaporating it in the presence of water, taking overhead a product containing water, said butadiene cyclic dimer and some furfural, condensing said overhead product to obtain two phase separation into a water-furfural phase and a butadiene cyclic dimer-furfural phase, recycling the water-furfural phase to said zone, discarding said butadiene cyclic dimer-furfural phase, and withdrawing a bottom product of furfural of lowered butadiene cyclic dimer content, the amount of water present in said zone and conditions maintained in said zone being such that said furfural bottom product contains a substantial percentage of dissolved water ranging up to about 8 weight per cent.

11. The process of removing butadiene cyclic dimer from furfural which has been employed in the solvent extraction of butadiene and thereby contaminated with butadiene cyclic dimer which comprises feeding said dimer-contaminated furfural to a fractional distillation zone and therein fractionally distilling the same in the presence of water, taking overhead a product consisting essentially of water and said cyclic dimer, refluxing the distillation column with water and thereby scrubbing substantially all of the furfural from the overhead vapors leaving the same and thereby retaining the furfural in the column to be eventually removed as bottom product, and withdrawing a bottom product of furfural essentially free from butadiene cyclic dimer, the amount of water present in said zone and conditions maintained in said zone being such that said furfural bottom product contains a substantial percentage of dissolved water ranging up to about 8 weight per cent.

DONALD R. DOUSLIN.
CHARLES F. WEINAUG.